United States Patent [19]

Zahorecz

[11] 4,178,127

[45] Dec. 11, 1979

[54] VARIABLE PITCH IMPELLER

[76] Inventor: Zoltan P. Zahorecz, 1424 Oakcrest Ave., S. Pasadena, Calif. 91030

[21] Appl. No.: 585,339

[22] Filed: Aug. 27, 1975

[51] Int. Cl.² .................... B63H 3/00; F03D 7/04
[52] U.S. Cl. ..................... 416/23; 416/131; 416/140; 416/119
[58] Field of Search ............. 416/23, 24, 139, 140, 416/41, 131, 119, 136, 132 B

[56] References Cited

U.S. PATENT DOCUMENTS

| | | | |
|---|---|---|---|
| 1,556,012 | 10/1925 | Flettner | 416/23 |
| 1,780,431 | 11/1930 | McCarroll | 416/23 |
| 2,180,922 | 11/1939 | Bothezat | 416/129 X |
| 2,453,803 | 11/1943 | McCormick | 416/139 |
| 2,454,440 | 11/1948 | Foulston | 416/23 |
| 2,622,686 | 12/1952 | Chevreau et al. | 416/41 X |
| 2,642,143 | 6/1953 | Miller | 416/24 |
| 2,950,768 | 8/1960 | Wagner | 416/140 X |
| 2,998,850 | 9/1961 | Armstrong | 416/23 |
| 3,877,836 | 4/1975 | Tompkins | 416/23 X |

FOREIGN PATENT DOCUMENTS

| | | | |
|---|---|---|---|
| 216337 | 1/1957 | Australia | 416/41 |
| 912530 | 5/1954 | Fed. Rep. of Germany | 416/23 |
| Ad. 54272 | 9/1948 | France | 416/41 |
| 534599 | 3/1922 | France | 416/23 |
| 575990 | 8/1924 | France | 416/23 |
| 912906 | 8/1946 | France | 416/41 |
| 965996 | 9/1950 | France | 416/41 |
| 990595 | 9/1951 | France | 416/23 |
| 512363 | 1/1955 | Italy | 416/24 |
| 193827 | 3/1924 | United Kingdom | 416/23 |

*Primary Examiner*—Everette A. Powell, Jr.
*Attorney, Agent, or Firm*—Fraser and Bogucki

[57] ABSTRACT

A system is provided to adjust the operating angle of attack of a variable pitch impeller blade in response to different conditions. The impeller blade is pivotally mounted around a pivot axis and a small control surface attached to the blade provides a turning moment around the pivot axis to oppose a similar moment provided by the lift component of the blade. The operating angle of attack of the blade is determined by the angle at which the moment from the control surface tapers off as it approaches stall range, thus equalizing the moment from the impeller blade.

12 Claims, 8 Drawing Figures

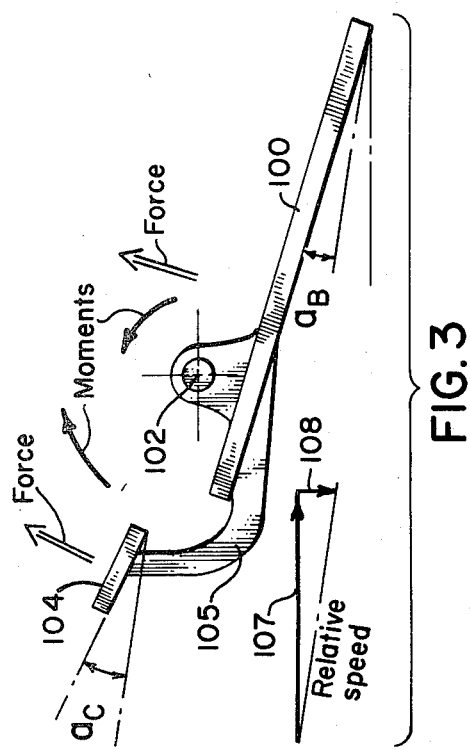
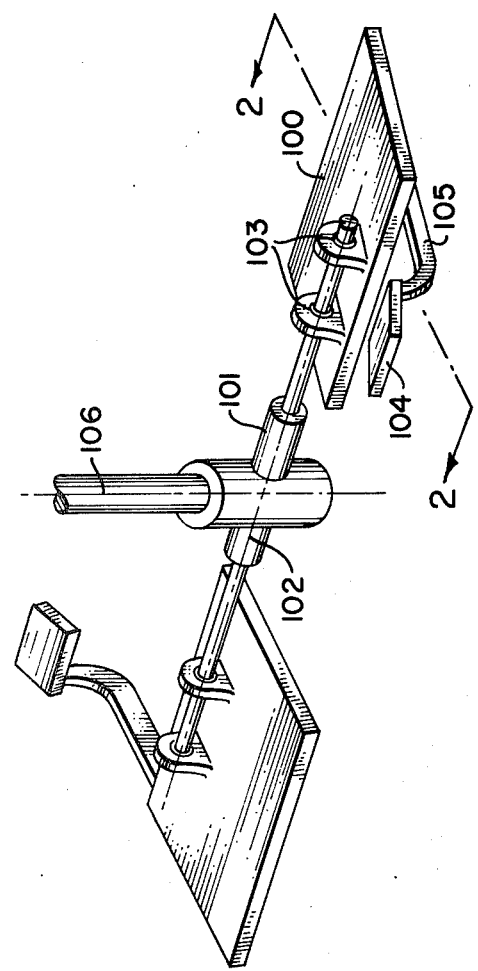
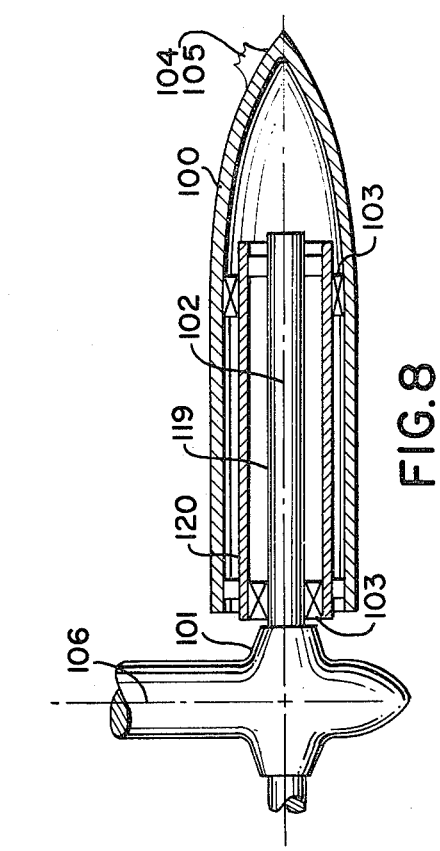
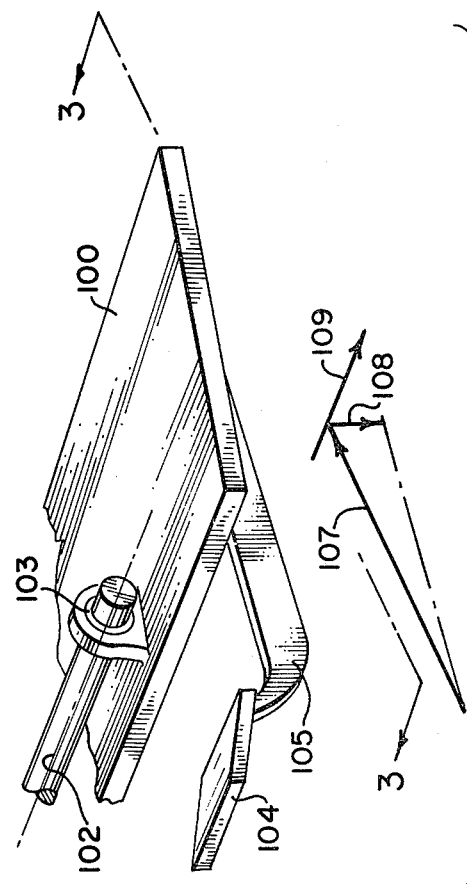

VARIABLE PITCH IMPELLER

BACKGROUND OF THE INVENTION

The present invention relates to impellers and more particularly to impellers with variable pitch self adjustable blades. Most impellers both driven and driving are exposed to varying operating conditions some of which are unknown or unexpected at the time of the original design. Some of these varying conditions are imposed by characteristics of the flow media others by changes in magnitude and direction of the flow surrounding the impeller. Typical flow media characteristics which might change during operation are density, viscosity, bubbles and solid particles.

In an embodiment where the impeller works in an enclosed area the local speed relative to the impeller blade might be uncertain due to several factors, as in case of a tank the diameter, straight length, liquid level and tank internals.

Another embodiment where the impeller is exposed to an open environment, like a windmill, the design parameters change and require adjustment to the optimum conditions imposed by temperature, wind speed and direction.

Compared to the numerous existing variable pitch inpellers the herewith presented invention has several advantages, it is simple in its mechanical features, has only a few essential parts, it is flexible to adapt to a wide range of applications, it does not require an external power source, sensing instruments or supervision.

The principal object of this invention is to provide for a variable pitch impeller which adjusts the impeller blade angle to the local relative speed between fluid media and impeller blade angle.

Another object of the invention presented is to utilize a simple control surface as sensor to initiate a necessary change in the impeller blade angle.

A further object of the invention is to utilize the control surface to energize the variation in the impeller blade angle.

A still further object is to accomplish a relatively complicated task with only a few mechanical parts.

Other objects, features and advantages of the invention not described herein will become understood from a consideration of the specification with reference to the accompanying drawings forming part thereof.

SUMMARY OF THE INVENTION

In systems in accordance with the invention, the lift angle of a lift surface relative to a fluid medium is adjusted depending upon the relative velocity between the lift surface and the fluid medium. The lift surface is pivotally coupled to a base such as to have a lift center that is spaced apart from the pivot axis. A control surface fixedly coupled to the lift surface extends therefrom to provide a control lift center at a different radial position than the lift center of the lift surface from the pivot axis, and so provides an opposite pivot moment on the lift surface about the pivot axis. The angle of the control surface relative to the lift surface is selected to provide a tapering off of the gradient of the lift component from the control surface at a predetermined relationship of relative fluid velocity and lift angle at which the opposite pivot moments cancel, such that the angle of the lift surface is varied automatically with relative fluid velocity but is stable at such velocity.

In accordance with the invention, the control surface may be disposed in various geometries relative to the lift surface, and mounted in different ways. The lift surface may comprise an individual member that is mounted to pivot in rotatable or torsional fashion about the pivot axis, and be movable along a relatively linear path relative to the fluid medium, or may comprise one of a number of impeller blades mounted on a rotatable base so as to move within a fluid medium.

BRIEF DESCRIPTION OF THE DRAWINGS

FIG. 1 is an isometric view of an embodiment of the invention;

FIG. 2 is a fragmentary isometric view taken generally along line 2—2 of FIG. 1;

FIG. 3 is a section taken along line 3—3 of FIG. 2;

FIG. 8 is a longitudinal section along the pivot axis of an impeller blade, where torsion bars serve as pivot.

DETAILED DESCRIPTION OF THE INVENTION

Figure 4:
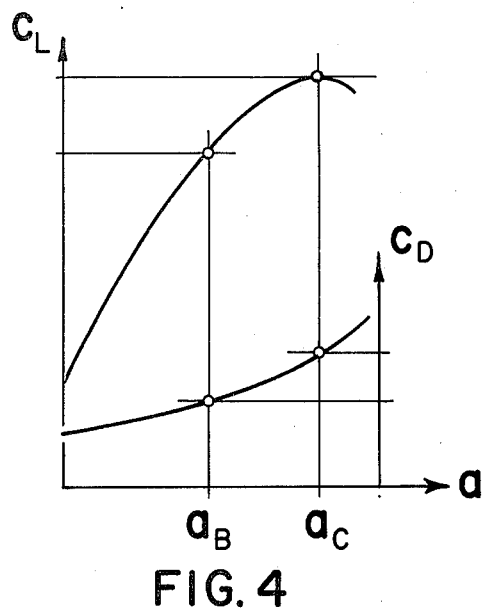
FIG. 4 is a diagram of the lift and drag coefficients of a foil, like one serving as an impeller blade or control surface.

Referring to FIG. 1 there is shown an embodiment of the invention as an agitator inside a processing tank. The following description is given for one impeller blade assembly, since multiple blades utilize the same principle. The impeller blade denoted 100 on the drawing is mounted on its pivot axis 102 thru bearings 103 and is supported on the carrier of the impeller assembly thru hub 101. The pivot axis 102 and its mounting provide for the pitch variation. The central rotational axis of the carrier is marked 106. The control surface 104 is attached to the impeller blade assembly by arm 105.

Relative to the central axis of rotation three velocity components are distinguishable, as marked on FIG. 1, tangential 107, axial 108 and radial 109. For an axial type impeller, in accordance with FIG. 1, the velocity components useful for the self adjustment of the blade angle are the tangential 107 and the axial 108. These two components form the resultant velocity which provides the relative speed on the impeller blade assembly.

FIG. 3 is a schematic section of the fragmentary view of FIG. 2. Description of the operation of the self adjustment is based on FIG. 3. In fluid dynamics a flow passing a foil, impeller blade or control surface, will exert a force on the foil. The magnitude of this force depends on the characteristics of the foil and of the angle of attack, which angle is in direct relation with the pitch, and is the angle formed by the resultant velocity component and the foil. As shown on FIG. 3 the force exerted by the flow creates a clockwise moment due to the control surface around the pivot axis 102 and the force acting on the impeller blade creates a counterclockwise moment around the same axis. Equalization of these two counteracting moments will set the operating angle of attack of the impeller blade assembly. In case an operating parameter changes like direction or magnitude of a velocity component or density of the flow media, which parameter has an effect on the force which force is created by the flow on the control surface 104 and on the impeller blade 100, the two counteracting moments will seek equalization, thus self adjustment of the impeller blade assembly will take place. The effects of weight and other inevitable mass forces to which the impeller blade assembly is exposed to are not discussed herewith in order to simplify the description.

FIG. 4 depicts the lift and drag component characteristics of a foil in relation to the angle of attack, on the vertical axis of the diagram the $c_L$ is for the lift component and $c_D$ is for the drag component while the horizontal axis of the diagram is for the angle of attack. The force created by the flow on the foil is the resultant of these lift and drag components. According to FIG. 4 both the control surface and the impeller blade have identical foil characteristics and there is a preset difference between their respective blade angles, which difference is $a_C$-$a_B$, where $a_B$ is the angle of attack to which the impeller blade is exposed and $a_C$ is the angle of attack to which the control surface is exposed.

Operation of the self adjustment is a result of a sequence in which sequence with increasing angle of attack which is a result of the greater moment exerted by the control surface, the force on both the control surface and the impeller blade will increase up till the $a_C$ angle of attack of the control surface reaches the region on the characteristic curve of its lift component where it starts to flatten out, thus the moment from the control surface starts to decrease while the other moment around the pivot axis from the impeller blade is still on the increase. The two moments will equalize and the equilibrium will set the operating pitch of the impeller. It is obvious from the description that in case an operating parameter like the axial component of the velocity changes, the two moments around the pivot axis of the pitch variation 102 will tend to equalize and retain the angle of attack by adjusting the impeller blade angle.

Figure 5:
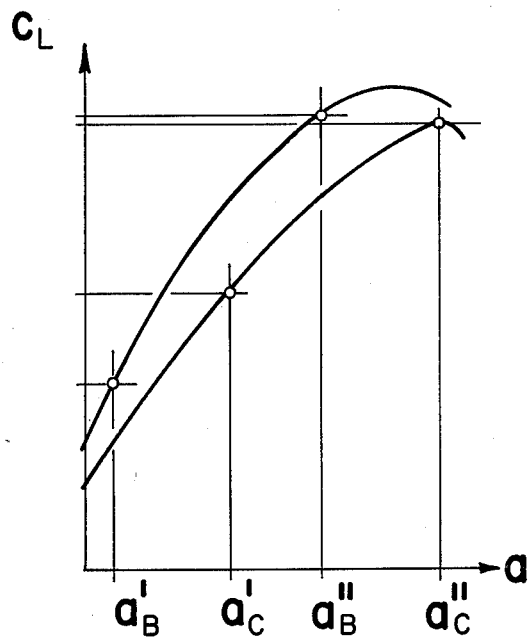
FIG. 5 is similar to FIG. 4, except for showing the characteristics of two foils, like blade and control surface.
Figure 6:
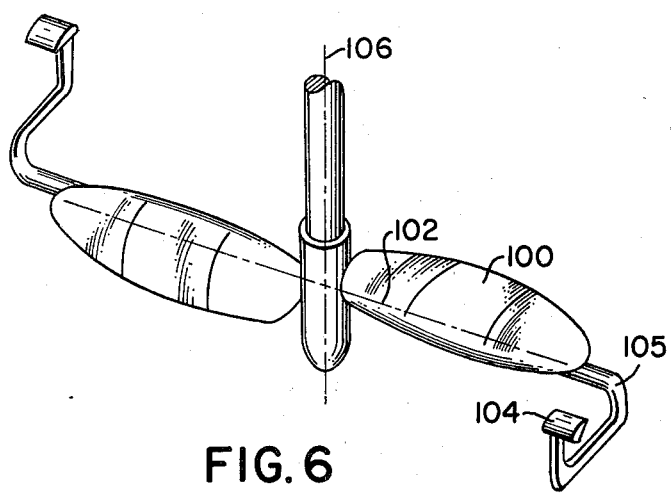
FIG. 6 is similar to FIG. 1, except for a different embodiment.

There is a large number of shapes possible for the foil, cross section, of the impeller blade and control surface, each of these shapes with a special characteristic curve of lift and drag components; as a result there are many combinations feasible to achieve optimum operating conditions. A possible combination where the foil of the control surface and the foil of the impeller blade have different characteristics is shown on FIG. 5, which FIG. is similar to FIG. 4 except it depicts the lift characteristics of two foils. On FIG. 5 an initial condition of the angle of attack for the control surface is marked by $a_C'$ and for the impeller blade by $a_B'$ and respectively the operating angle of attacks are marked by $a_C''$ and $a_B''$. It is noted herewith that secondary velocities like interaction of the streamlines around the control surface and the impeller blade can result that the resultant velocity vector is not identical for the control surface and for the impeller blade. A method to avoid interaction is shown on FIG. 6. On FIG. 6 an axial type impeller is shown with the control surface located radially outward from the impeller blade which blade is depicted as a streamlined wing or propeller shape. To stabilize the operation of a variable pitch self adjustable impeller the design can be equipped with pulsation dampeners in any convenient manner.

Figure 7:
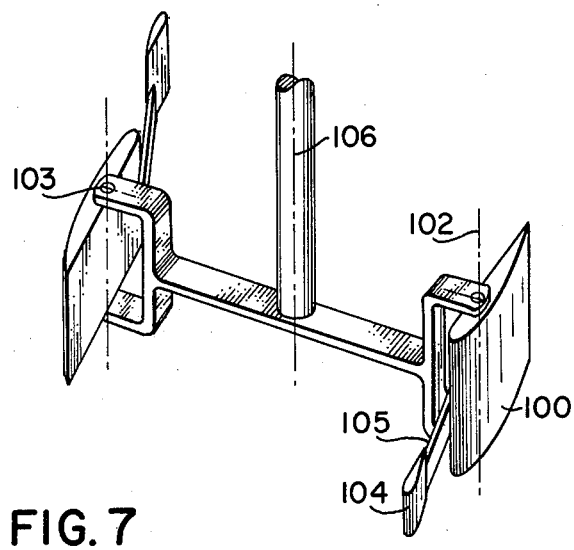
FIG. 7 depicts the application of the invention to a radial type impeller.

FIG. 7 shows the application of the impeller and control surface assembly to basicly radial flow conditions. As the axial type impeller the radial type is suited to both driving and driven in other words energy utilizing like a windmill or energy consuming like a mixer in a chemical reactor applications. The operation—self adjustment—of the radial type impeller follows the same sequence as described for the axial type in relation to FIGS. 1 through 6. It is emphasized that the importance of balancing the mass forces in case of a self adjustable radial type impeller is more significant than for the axial type. Herewith is mentioned that position of the pivot axis, impeller blade and control surface could be anywhere between a purely axial or radial types of slanting the pivot axis of the pitch variation to the central rotational axis of the carrier; also the presented invention extends itself to cases where the theoretical extension of the pivot axis of the pitch variation does not intersect the rotational axis of the carrier. An extreme of this last case is the purely radial type impeller where the pivot axis of the pitch variation is parallel with the rotational axis of the carrier. Marking of parts is similar to FIG. 1.

FIG. 8 is a longitudinal section along the axis of an impeller blade. On this figure the axis 102 consists of a torsionally flexible rod 119 located inside a similar flexible tube 120. The rod is attached to the hub 101 of the carrier and to the tube, while the other end of the tube is attached to the root end of the impeller blade 100. Angular displacements to promote pitch variation is provided for by bearings 103 arranged between rod 119, tube 120 and impeller blade. The impeller blade itself could be of torsionally flexible design in which case there is a long chain of flexible members between the tip of the impeller blade, where the control surface providing the torsional moment is located and the root end of the rod 119. The control surface 104 will twist first the impeller blade 100 from its tip to the root end, then the tube 120, from root end to tip end and next the rod member 119 from tip to root end. It is also a feasible arrangement to construct the joints, between the flexible members 119, 120 and the impeller blade and also at the root end of the rod 119 where the entire blade assembly is attached to the carrier, of torsionally flexible discs or springs in order to improve the torsional flexibility of the impeller suggested on FIG. 8.

A few advantages of the torsionally flexible pivot axis design, compared to pivot axes or shafts supported and arranged to rotate in bearing type elements, are: the absence of resisting the difference between the friction factor of rest and of the sliding friction factor, the flexible pivot has less chance to clog up and hamper the self adjustment of the impeller blade angle in case the impeller operates in flow media with fouling tendency, the flexible pivot design has a built in dampening effect against angular oscillations of the blade angle.

A special application of the basic idea of the Variable Pitch Impeller invention, related to impellers operating in steady environment where parameters of the flow media are stable, yet the vector of the relative velocity is unknown and hard to predict, is the following. A test impeller equipped with an indicator to show the blade angle achieved during operation is subjected to conditions resembling actual operation. After a test run the blade angle indicator is observed and the blade angle is permanently set in accordance with the reading of the blade angle indicator. In practice where impellers are mass produced with identical geometry, except for the blade angle, one test impeller equipped with control surface and blade angle indicator is tested for each particular application and the mass produced impellers blade angle affixed in accordance with the reading of the test impellers blade angle indicator; in case an individual impeller is produced for a particular application, where the flow media is unchanged, this individual impeller equipped with control surface and blade angle indicator is tested by simulating actual operating conditions. After the test run the blade angle is affixed in accordance with the reading of the blade angle indicator, both the control surface and the blade angle indicator can be removed at this point, since the impeller will operate under steady conditions.

It is stressed herewith that variations, modifications and design details can be effected within the scope and spirit of the Variable Pitch Impeller Invention as described herein.

I claim:

1. A mechanism for adjusting the lift angle of a lift surface relative to a fluid medium, dependent upon the relative velocity between the lift surface and the fluid medium, comprising:
   a base;
   means pivotally coupling the lift surface to said base along a selected axis, the lift center of the lift surface being spaced apart from the pivot axis;
   and a control surface fixedly coupled to said lift surface and extending therefrom to provide a control lift center at a different radial position than the lift center of the lift surface from the pivot axis, the lift components of the control surface and the lift surface acting in response to the fluid medium to provide opposite pivot moments on the lift surface about the pivot axis, such that the angle of the lift surface relative to the fluid medium stabilizes at a position dependent upon the relative velocity of the fluid medium, wherein the angle of the control surface relative to the lift surface is selected to provide a tapering off of the gradient of the lift component from the control surface at a predetermined relationship of relative fluid velocity and lift angle at which the opposite pivot moments cancel, such that the angle of the lift surface is varied automatically with relative fluid velocity but is stable at such velocity.

2. The invention as set forth in claim 1 above, wherein the lift centers of the lift surface and the control surface are disposed on opposite sides relative to the pivot axis.

3. The invention as set forth in claim 2 above, wherein the control surface comprises a planar element and at least one coupling arm supporting the planar element from the forward edge of the lift surface.

4. The invention as set forth in claim 2 above, wherein the control surface comprises a planar element and at least one coupling arm supporting the planar arm from a side edge of the lift surface.

5. The invention as set forth in claim 2 above, wherein the means for pivotally coupling the lift surface to the base comprises flexible torsion means.

6. A multi-blade impeller assembly rotatable about a selected axis within a fluid medium comprising:
   a base member rotatable about the axis;
   at least two impeller blades pivotally mounted on the base member and disposed to pass through the fluid medium during rotation, each impeller blade having a lift center spaced apart from the pivot axis; and
   at least two control surface means, each fixedly coupled to a different one of said impeller blades and providing a lift force at a different radius from the pivot axis to adjust the angle of attack of the impeller blade in response to relative velocity of the fluid medium, wherein the angle of each control surface relative to the associated blade is selected to provide a tapering off of the gradient of the lift component from the control surface at a predetermined relationship of relative fluid velocity and lift angle at which the opposite pivot moments cancel, such that a stabilized attack angle for the blade results that varies with the relative velocity of the fluid medium relative to the impeller blade.

7. The invention as set forth in claim 6 above, wherein the impeller blades are mounted to pivot about axes that are parallel to the selected axis.

8. The invention as set forth in claim 6 above, wherein the impeller blades are mounted to pivot about axes that are normal to the selected axis.

9. A variable pitch blade assembly movable relative to a fluid medium and adopting an optimum attack angle related to the relative velocity between the blade assembly and the fluid medium, comprising:
   a blade pivotally mounted about an axis normal to the direction of relative movement and generating a first lift vector component centered at a first selected radius from the axis; and
   a control surface fixedly coupled to the blade and extending therefrom, said control surface being positioned to generate a second lift vector component centered at a second selected radius from the axis, and tending to rotate the blade in the direction opposite to the first lift vector component, the vector components and lift forces being related such that the turning moment imparted by the control surface exceeds the opposing turning moment from the blade for low angles of attack of the control surface, to increase said angle of attack until dynamic lift from the control surface approaches a stall characteristic, such that a stabilized attack angle for the blade results that varies with the relative velocity of the fluid medium relative to the blade assembly.

10. A mechanism for automatically varying the angle of attack of an impeller blade relative to a base structure in accordance with relative fluid velocity, comprising:
    means pivotally mounting the impeller blade on the base structure; and
    a control lift surface fixedly coupled to and spaced apart from the impeller blade, the fluid dynamic lifts of the impeller blade and control surface exerting opposing moments around the pivot axis of said impeller blade, wherein the control surface is angled relative to the impeller blade to approach a stall characteristic as the impeller blade approaches an optimum angle for the relative fluid velocity.

11. The invention as set forth in claim 10 above, wherein the control surface is angled relative to the impeller blade surface to approach a stall characteristic as the impeller blade approaches an optimum angle for the relative fluid velocity.

12. The invention as set forth in claim 10 above, wherein said impeller blade has a generally planar lift surface, wherein the pivot axis lies in a plane parallel to the plane of the lift surface and the control surface has a generally planar surface that is also parallel to the pivot axis.

* * * * *